(12) United States Patent
L'Esperance et al.

(10) Patent No.: US 10,367,283 B2
(45) Date of Patent: Jul. 30, 2019

(54) CONNECTOR WITH THERMAL MANAGEMENT

(71) Applicant: Molex, LLC, Lisle, IL (US)

(72) Inventors: Frank L'Esperance, Santa Clara, CA (US); Jerry Kachlic, Glen Ellyn, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/699,775

(22) Filed: Sep. 8, 2017

(65) Prior Publication Data

US 2017/0373418 A1 Dec. 28, 2017

Related U.S. Application Data

(63) Continuation of application No. 14/912,200, filed as application No. PCT/US2014/051503 on Aug. 18, 2014, now Pat. No. 9,761,974.

(60) Provisional application No. 61/866,864, filed on Aug. 16, 2013.

(51) Int. Cl.
| | |
|---|---|
| *H01R 12/72* | (2011.01) |
| *G02B 6/42* | (2006.01) |
| *H01R 12/71* | (2011.01) |
| *H01R 13/6594* | (2011.01) |
| *H01R 24/60* | (2011.01) |

(52) U.S. Cl.
CPC ......... *H01R 12/721* (2013.01); *G02B 6/4268* (2013.01); *G02B 6/4269* (2013.01); *H01R 12/712* (2013.01); *H01R 13/6594* (2013.01); *H01R 24/60* (2013.01)

(58) Field of Classification Search
CPC .. H01R 12/721; H01R 2/712; H01R 13/6594; H01R 24/60
USPC .......................................................... 439/61
See application file for complete search history.

(56) References Cited

U.S. PATENT DOCUMENTS

| | | | | |
|---|---|---|---|---|
| 5,699,853 | A | * | 12/1997 | Goth ..................... H01L 23/427 165/104.21 |
| 6,278,609 | B1 | | 8/2001 | Suzuki et al. |
| 6,716,039 | B1 | | 4/2004 | Peloza et al. |
| 6,749,448 | B2 | * | 6/2004 | Bright .................. G02B 6/4201 439/160 |
| 6,758,692 | B2 | | 7/2004 | Walkup et al. |
| 6,822,860 | B2 | * | 11/2004 | Owens .................... G02B 6/293 165/104.33 |
| 6,851,869 | B2 | | 2/2005 | Miller et al. |
| 6,980,437 | B2 | | 12/2005 | Bright |
| 7,070,446 | B2 | * | 7/2006 | Henry ................. H01R 23/6873 439/541.5 |
| 7,641,515 | B1 | | 1/2010 | Szczesny et al. |
| 8,277,252 | B2 | | 10/2012 | Fogg et al. |

(Continued)

FOREIGN PATENT DOCUMENTS

| | | |
|---|---|---|
| CN | 201467613 U | 5/2010 |
| JP | 2005-520296 A | 7/2005 |

*Primary Examiner* — Alexander Gilman
(74) *Attorney, Agent, or Firm* — Molex, LLC

(57) ABSTRACT

A connector is disclosed that includes a cage that defines a first port and second port that are vertically spaced apart. Card slots are positioned in the ports. A thermal management module is positioned between the two ports. The thermal management module directs thermal energy from one or both ports past a rear wall of the connector. A heat sink can be coupled to the thermal management module to improve thermal dissipation.

18 Claims, 16 Drawing Sheets

(56) References Cited

U.S. PATENT DOCUMENTS

| | | | |
|---|---|---|---|
| 8,393,917 B2* | 3/2013 | Regnier | H05K 7/20709 439/485 |
| 8,467,190 B2 | 6/2013 | Yi et al. | |
| 8,545,267 B2 | 10/2013 | Fogg et al. | |
| 8,657,631 B2 | 2/2014 | Lang et al. | |
| 8,740,643 B2* | 6/2014 | Kuang | H01R 12/721 439/541.5 |
| 8,870,595 B2 | 10/2014 | Schmitt et al. | |
| 8,926,360 B2 | 1/2015 | Manahan et al. | |
| 9,246,252 B2 | 1/2016 | Kachlic et al. | |
| 9,246,280 B2 | 1/2016 | Neer et al. | |
| 9,252,538 B2 | 2/2016 | Recce | |
| 9,325,100 B2 | 4/2016 | Hirschy | |
| 9,391,407 B1 | 7/2016 | Bucher et al. | |
| 9,484,678 B1 | 11/2016 | Briant et al. | |
| 9,518,785 B2* | 12/2016 | Szczesny | F28D 15/0275 |
| 9,647,366 B1* | 5/2017 | Turowski | H01R 12/775 |
| 9,668,378 B2* | 5/2017 | Phillips | H05K 7/20418 |
| 9,761,974 B2* | 9/2017 | L'Esperance | G02B 6/4268 |
| 9,846,287 B2* | 12/2017 | Mack | G02B 6/4269 |
| 2003/0171016 A1 | 9/2003 | Bright et al. | |
| 2006/0089042 A1 | 4/2006 | Lawton et al. | |
| 2008/0212277 A1 | 9/2008 | Aoto et al. | |
| 2009/0109627 A1 | 4/2009 | Murr et al. | |
| 2011/0031860 A1 | 2/2011 | Yang | |
| 2012/0058670 A1* | 3/2012 | Regnier | H01R 13/65802 439/485 |
| 2012/0168122 A1* | 7/2012 | Skepnek | H01L 23/367 165/80.2 |
| 2012/0196477 A1* | 8/2012 | Nichols | H01R 13/518 439/607.01 |
| 2013/0033821 A1 | 2/2013 | Szczesny et al. | |
| 2013/0114211 A1* | 5/2013 | Regnier | H05K 7/20509 361/704 |
| 2014/0080352 A1* | 3/2014 | Xue | G02B 6/4261 439/487 |
| 2014/0160679 A1* | 6/2014 | Kelty | H05K 7/20672 361/700 |
| 2015/0171558 A1 | 6/2015 | Yu et al. | |
| 2016/0093996 A1* | 3/2016 | Phillips | H01R 24/60 439/487 |

\* cited by examiner

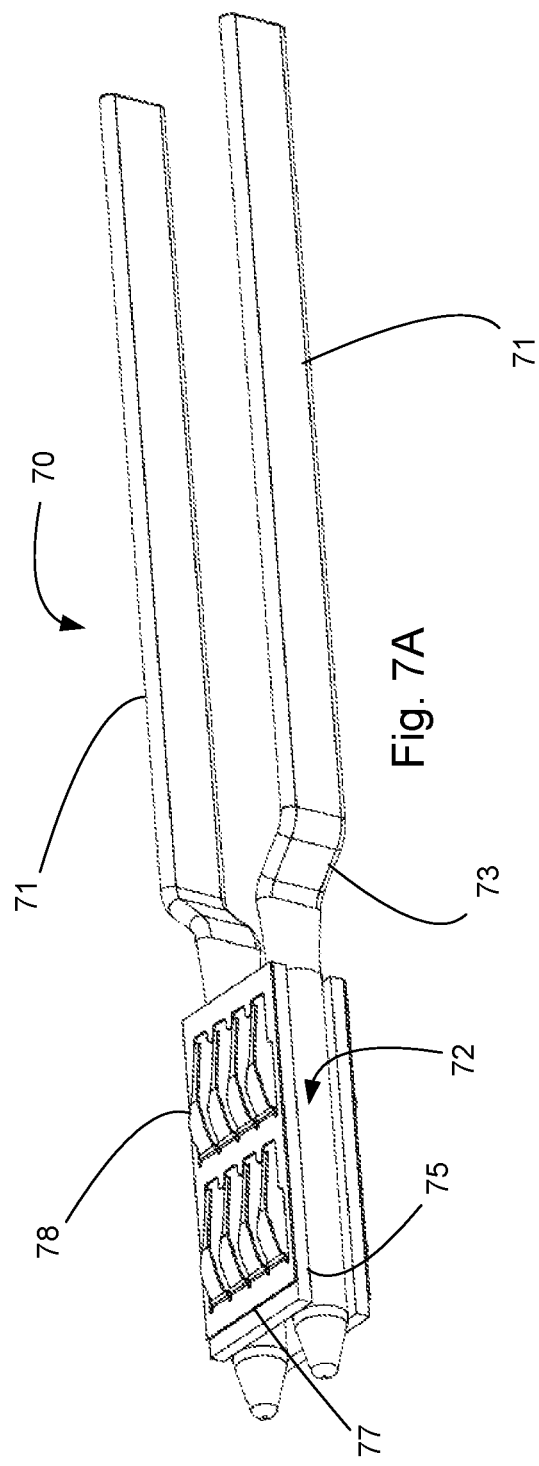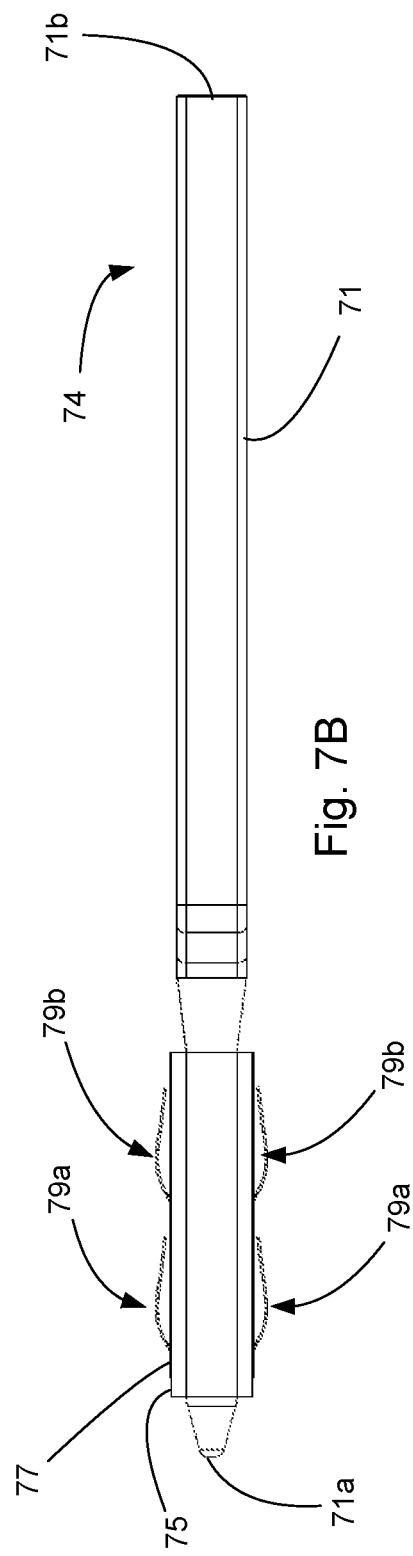
Fig. 7A
Fig. 7B

CONNECTOR WITH THERMAL MANAGEMENT

RELATED APPLICATIONS

This application is a continuation of U.S. application Ser. No. 14/912,200, filed Aug. 18, 2014, now U.S. Pat. No. 9,761,974, which is incorporated by reference in its entirety and which is a national phase of PCT Application No. PCT/US2014/051503, filed Aug. 18, 2014, which in turn claims priority to U.S. Provisional Application No. 61/866,864, filed Aug. 16, 2013, which is incorporated herein by reference in its entirety.

TECHNICAL FIELD

This disclosure relates to field of IO connectors, more specifically to the field of receptacle configured to manage thermal energy.

DESCRIPTION OF RELATED ART

Input/Output (I/O) connectors are commonly used to provide connectivity between boxes or racks of computers, routers and switches. Commonly used formats of I/O connectors include Small form-factor pluggable (SFP), Quad small form-factor pluggable (QSFP), miniSAS, miniSAS HD and PCIe 8× connectors. These connectors include plugs and receptacles that are defined by standard bodies and intended to provide reliable performance regardless of the vendor. As shown in FIG. 1, for example, the housing 10 of a receptacle typically is mounted on a circuit board 5 and can support a set of wafers 12 that provides rows of terminals 14. The terminals 14 include contacts 14a and tails 14b that extend from the wafers 12 in different directions. Many variations in the shape of the wafers and spacing of the rows and the housing exist, depending on the application.

While the mechanical format of each connector is defined in a specification, however, new versions of these connectors are being provided that offer increases in performance. For example, SFP connectors initially were used in systems that used non-return to zero (NRZ) encoding and the channels were intended to offer data rates of 1-5 Gbps range. Subsequent SFP+ connectors were developed to support 10 Gbps channel. Future versions of SFP style connectors can support 16 and even 25 Gbps. As can be expected, the cable assemblies are available in passive versions and active versions (such as active copper and optical). Due to the substantial increase in cost that results from using an active cable, passive copper cable assemblies are used when possible.

While the engineering work to enable these high data rates in the connector system is challenging, one issue that has been more difficult to address is the loss in the channel of copper cable assemblies just due to the physical medium used to carry the signal. Copper cable assemblies with perfectly accept loss budgets for supporting a data rate of 5 Gbps over a 10 meter length suddenly become too lossy at 25 Gbps (at least when using NRZ encoding), particularly when the losses in the supporting circuit board are considered. Given the strong desire in the industry to utilize NRZ encoding due to its relative ease of implementation, it thus becomes very difficult to use conventional copper cables and support a 10 meter length at a signaling frequency of about 13 GHz.

While it is possible that future advances in materials and cable construction will make it possible to support longer copper cable runs than about 2 meters, current materials tend to make 2 meters about maximum length for passive cable systems at 25 Gbps when using NRZ encoding. While the 2 meter length is not problem for a large number of applications (such as within a rack), it has become more common for an active cable assembly to be positioned in a number of the ports to support runs between different racks. Active cable assemblies are suited to supporting high data rates (such as 25 Gbps) over long runs (optical cable assemblies, for example, regularly support runs of 100 meters and more) and thus are not limited in that regard.

One major issue with the increased use of active cables assemblies, however, is the increased thermal burden the use of such assemblies place on the system. It is common for an active cable assembly to need to dissipate 3 or more watts of energy. Attempting to cool a module that is placed inside an electrically seal receptacle is relatively challenging. Thus, certain individuals would appreciate an improvement to the receptacle system used in I/O connectors.

SUMMARY

A connector is disclosed that can be configured as illustrated in the Figures. The connector includes a housing positioned in a cage. The cage provides shielding and helps define two ports that are aligned vertically aligned and correspond to vertically spaced apart card slots provided by the housing. A thermal transfer module is provided between the two ports. The thermal module directs thermal energy from between the two ports to behind the connector. The thermal transfer module includes a thermal interface that extends into at least one of the ports and further includes a heat pipe that is thermally coupled to the thermal interface. In operation, thermal energy is directed from the thermal interface to the heat pipe and out a rear of the cage. A heat sink can be provided at the rear of the cage to more effectively dissipate thermal energy from the heat pipe.

BRIEF DESCRIPTION OF THE DRAWINGS

The present invention is illustrated by way of example and not limited in the accompanying figures in which like reference numerals indicate similar elements and in which:

FIG. 7A illustrates a perspective view of an embodiment of a thermal transfer module.

FIG. 7B illustrates an elevated side view of the embodiment depicted in FIG. 7A.

DETAILED DESCRIPTION

Figure 1:
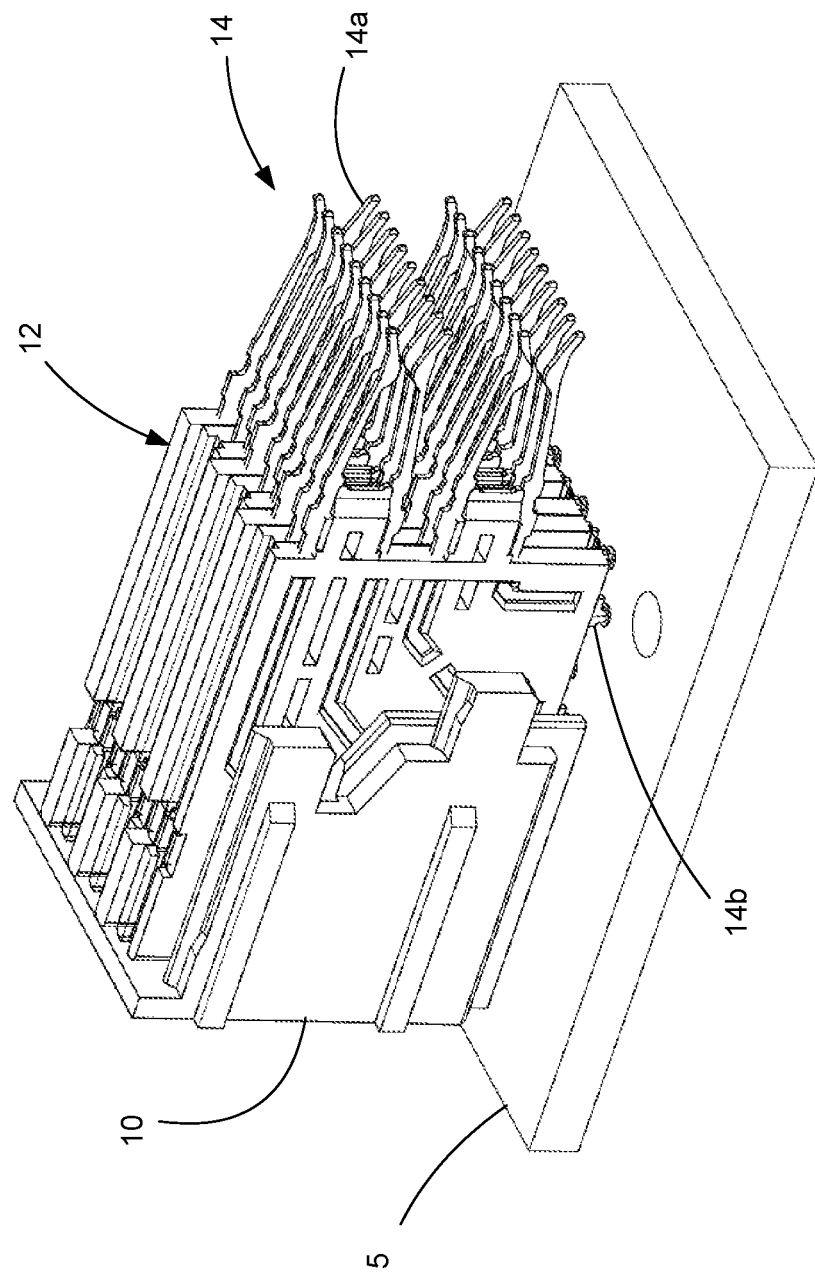
FIG. 1 illustrates a perspective simplified view of an embodiment of a housing mounted on a circuit board and supporting wafers, as is known in the art.
Figure 1A:
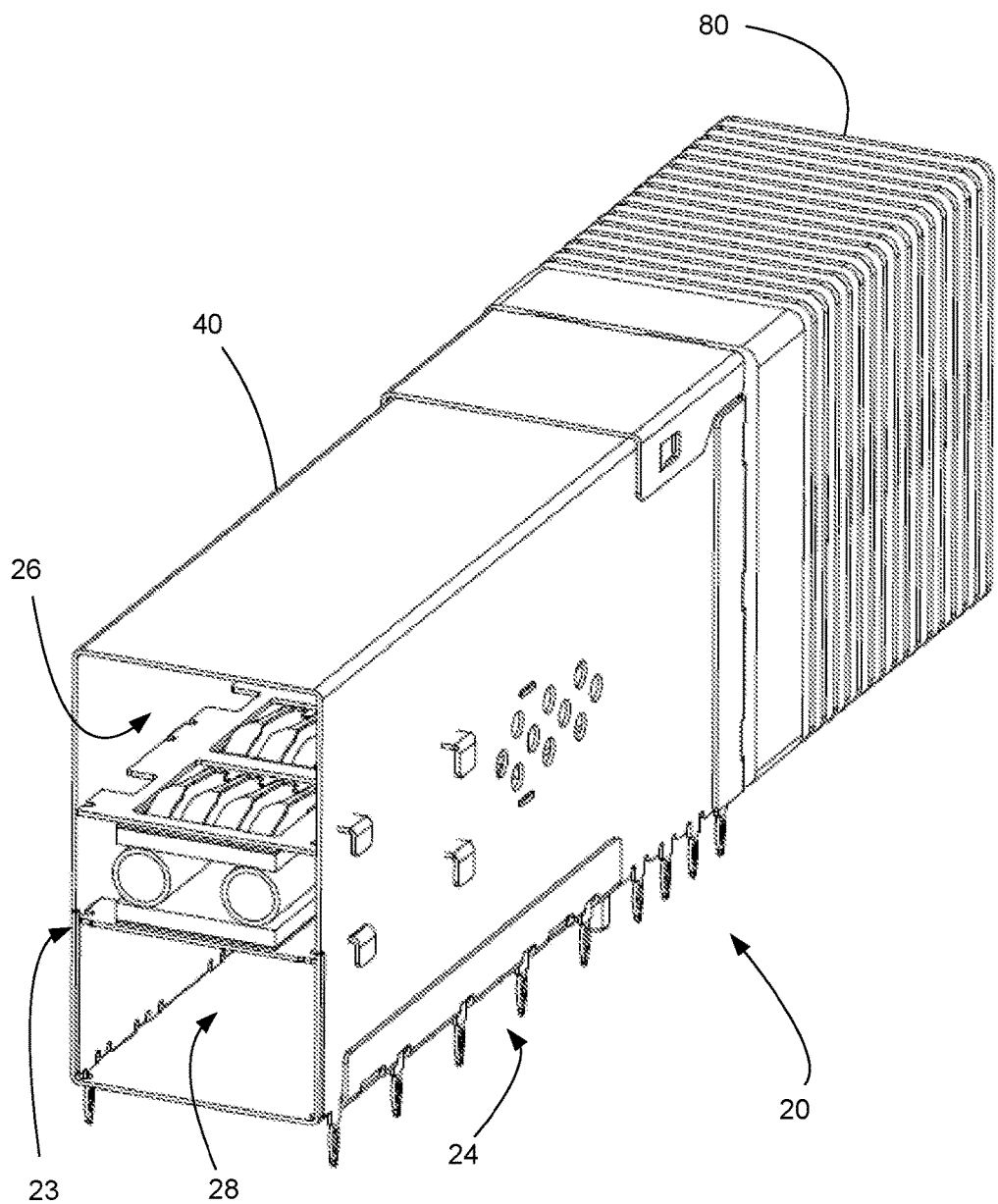
FIG. 1A illustrates a perspective view of an embodiment of a connector.

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

A connector 20 with a thermal management system 70 is disclosed in Figures. In an embodiment, the connector 20 includes a cage 40 that helps define a first port 26 and a second port 28. The connector 20 further includes a mating face 23 and a mount face 24 and also includes an optional heat sink 80. The cage 40 includes a front edge 43 and a rear wall 44 and can be formed by a top member 41a, a bottom member 41b and a rear member 41c. Of course, as is known, a cage could also be formed of a one piece construction that has all the various sides fold together to form the cage. Thus, the number of cage members is not intended to be limiting as there are a range of construction techniques for cages that are used in pluggable connectors. The cage 40 also includes mounting tails 48 that allow the connector 20 to be mounted on a supporting circuit board (not shown).

To form the ports 26, 28 an insert 90 is provided. The insert 90 can be positioned so as to define the bottom of the top port 26 and the top of the bottom port 28. As can be appreciated, the insert 90 includes thermal apertures 92 that will be discussed further below.

A housing 60 is positioned in the cage 40 and the housing 60 provides one or more card slots 62a, 62b, with at least one card slot aligned with each port 26, 28. As depicted, each card slot 62a, 62b includes terminals 65 positioned in terminal channels 66 on two opposing sides of the respective card slot. A thermal management module 70 is positioned between ports 26, 28. While not shown for purposes of brevity, the housing 60 is configured to support a set of wafers similar to the set of wafer 12 depicted in FIG. 1 with the set of wafers supporting the terminals that are positioned in the card slots.

It should be noted that it is expected that aspects of the depicted embodiments are most suitable to stacked connectors but this disclosure is not intended to be so limited unless otherwise noted). As discussed above, the housing 60 can be loaded with a set of wafers that support terminals so that terminals can be provided that extend from the card slot to a supporting circuit board. As depicted, for example, the housing 60 provides a set of vertically spaced apart card slots and in operation, terminals supported by wafers are positioned in the card slots.

Figure 1B:
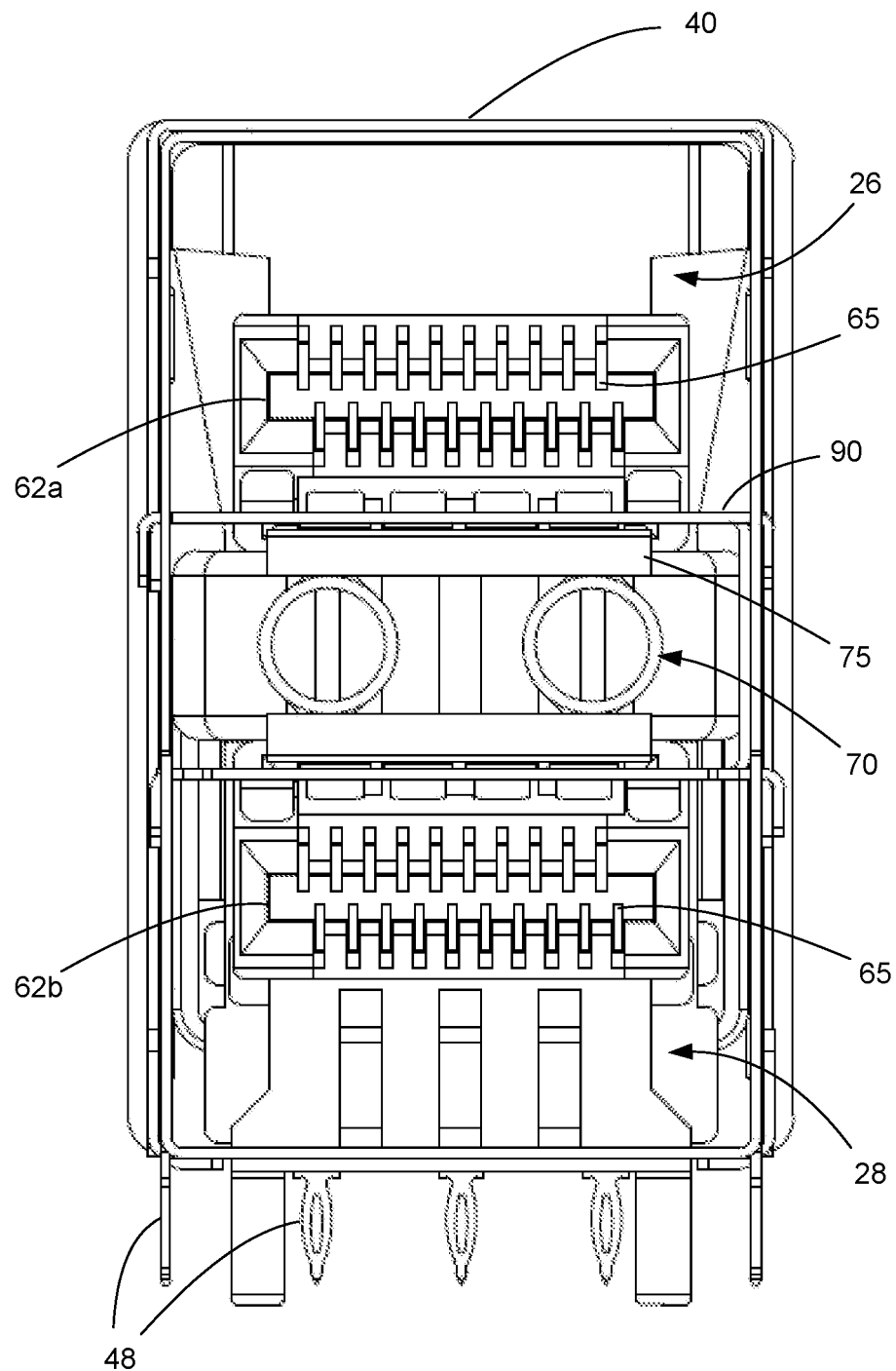
FIG. 1B illustrates an elevated front view of the connector depicted in FIG. 1A.
Figure 1C:
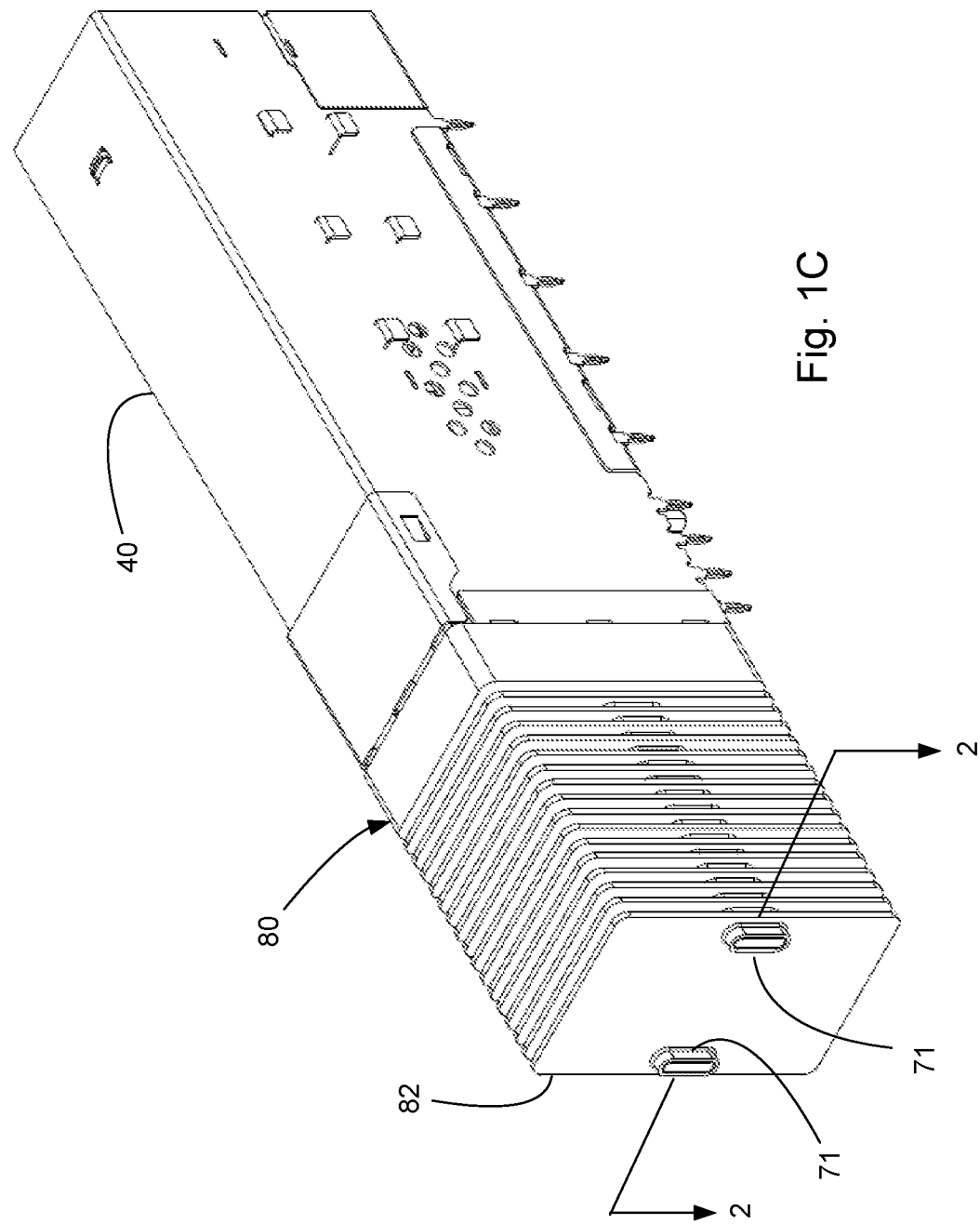
FIG. 1C illustrates another perspective view of the embodiment depicted in FIG. 1A.
Figure 2:
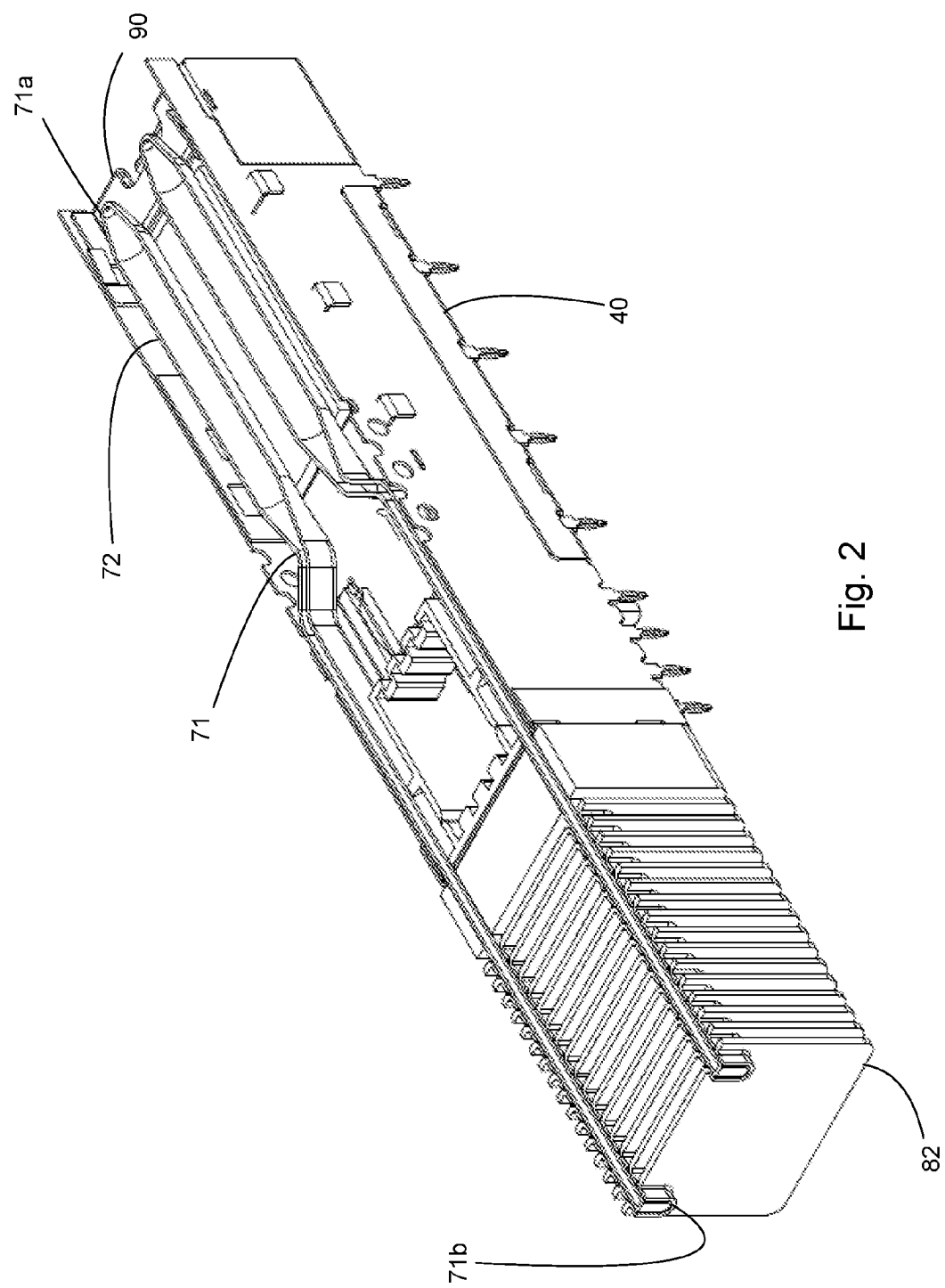
FIG. 2 illustrates a perspective view of a cross-section of the embodiment depicted in FIG. 1C, taken along line 2-2.
Figure 3:
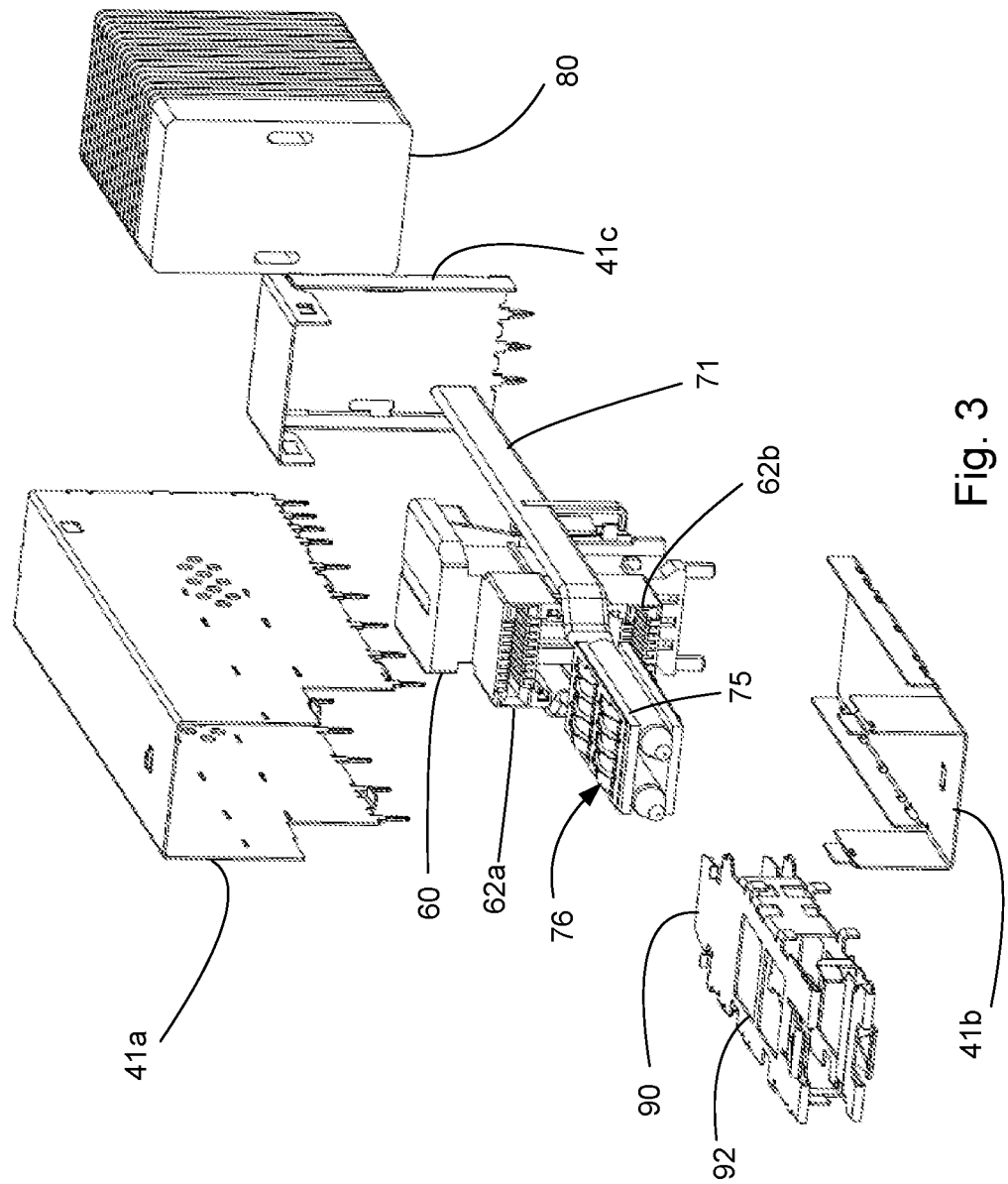
FIG. 3 illustrates an exploded perspective view of the embodiment depicted in FIG. 1A.
Figure 6:
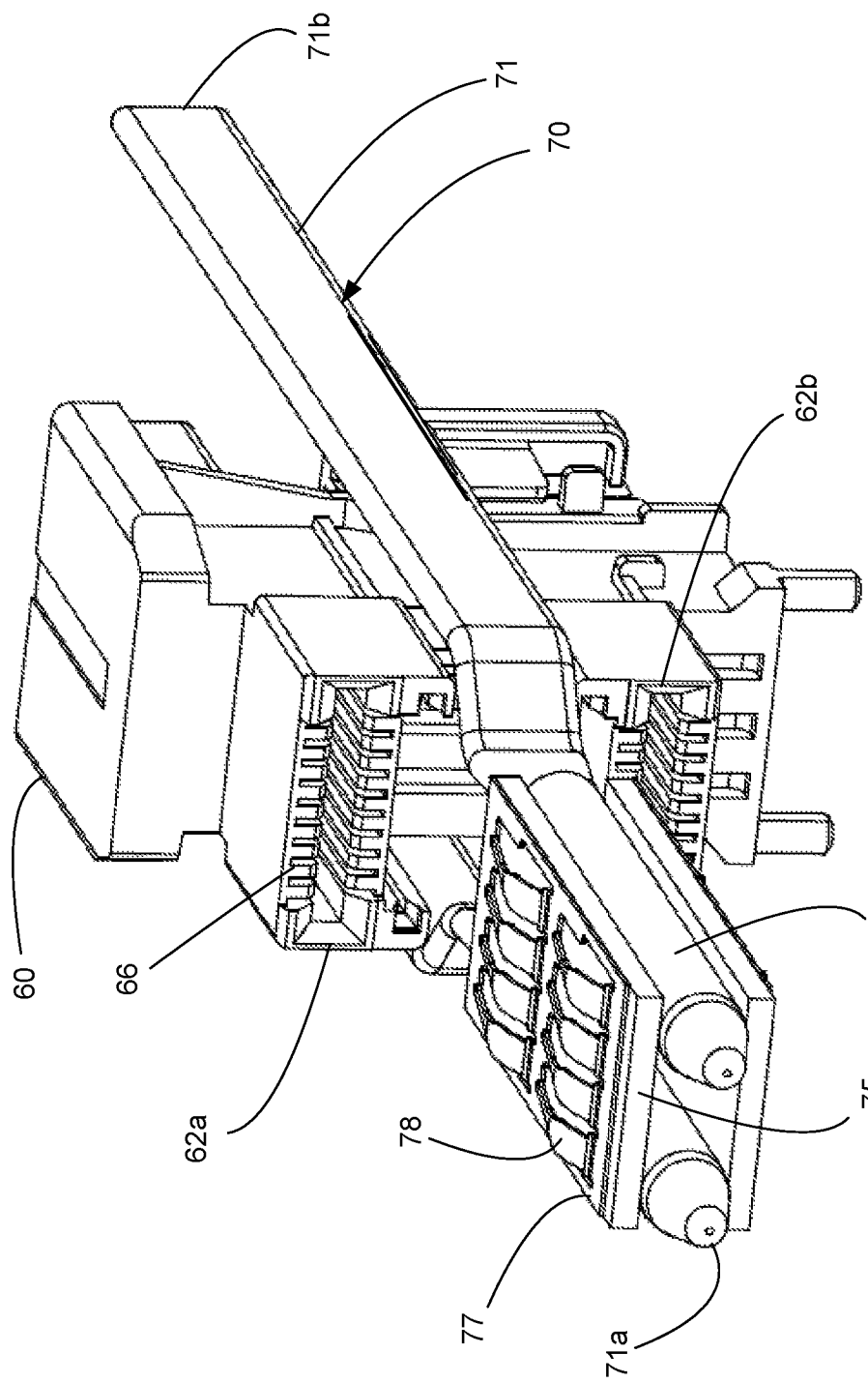
FIG. 6 illustrates a simplified perspective view of an embodiment of a housing and thermal transfer module.
Figure 8:
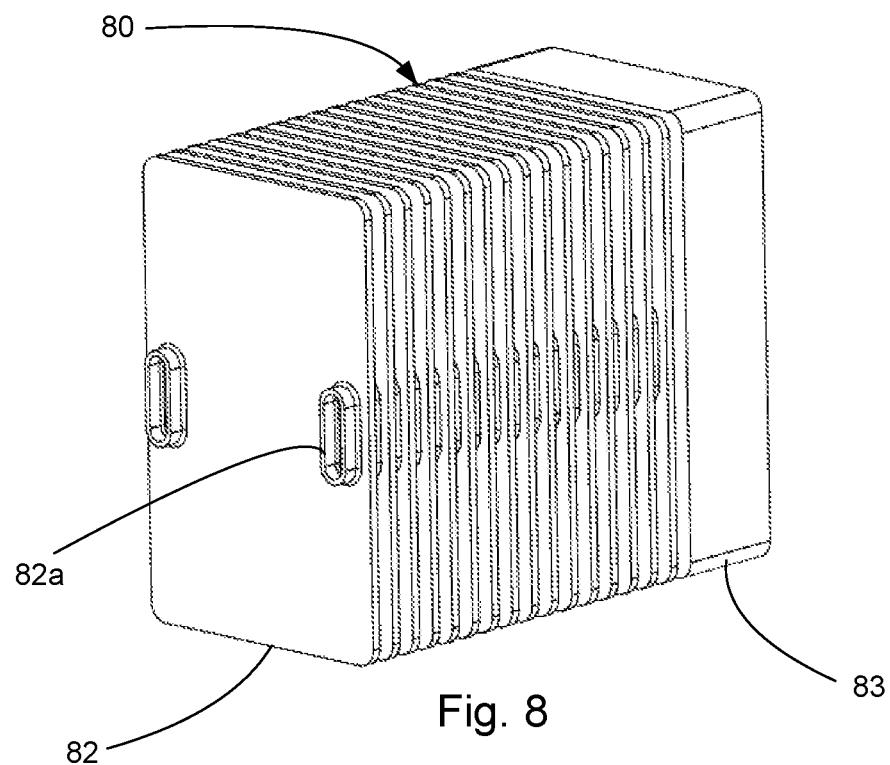
FIG. 8 illustrates a perspective view of an embodiment of a heat sink.

As noted above, a cage 40 is positioned around the housing 60 and helps shield the housing 60. Positioned between the ports 26, 28 is the thermal transfer module 70 that includes heat pipes 71 and each heat pipe 71 has a nose 71a and a rear 71b. The heat pipe 71 has a thermal chamber 72 that is thermally connected to the thermal interface 76, which includes a thermal plate 75. In an embodiment the thermal plate 75 can be soldered to the thermal chamber 72. The depicted thermal interface 76 further includes a base 77 that can be soldered to the thermal plate 75 and the base 77 supports fingers 78 that are configured to engage an inserted plug connector (not shown) and direct thermal energy away from the plug connector toward the thermal chamber 72 via the thermal plate 76. The thermal chamber 72 includes a liquid that, when exposed to the thermal energy, changes phase to a vapor and travels toward the rear 71b. The hot vapor cools once it is in the cooling region 74 and condenses back into a liquid. The liquid travels back to the thermal chamber 72 (capillary action can be used to direct the liquid back to the thermal chamber 72 if the heat pipe 71 is not angled) and repeats the process. The depicted heat pipe 71 includes a bend 73 that help direct the heat pipe 71 from a position that is more central to the housing 60 (e.g., at least partially overlapping with the card slot from a vertical alignment standpoint) to a position that is outside of the housing 60 (as can be appreciated by FIGS. 1B and 6).

The thermal transfer module 70 is supported by the insert 90. As can be appreciated, the fingers 78 are provided in two rows 79a, 79b. The rows of fingers 79a, 79b are aligned with the thermal apertures 92 and thus the fingers 78 extend through the thermal aperture 92. In an embodiment the thermal transfer module 70 can be soldered to the respective top and bottom of the insert 90, however such attachment is not required.

The thermal transfer module 70, as depicted, includes two heat pipes but could also use a single heat pipe if desired (the choice and design of the heat pipe(s) will naturally vary depending on the need thermal resistance between the port and the heat sink). Thus, while the use of two heat pipes is expected to increase performance compared to one heat pipe, for certain applications a heat pipe would be sufficient. Naturally, additional heat pipes beyond the depicted three could also be added but is expected that additional heat pipes will primarily increase cost without significantly improving the performance of the system. Naturally, if only one heat pipe were used then the location of the nose of the heat pipe might be more centrally located in the insert.

Figure 4:
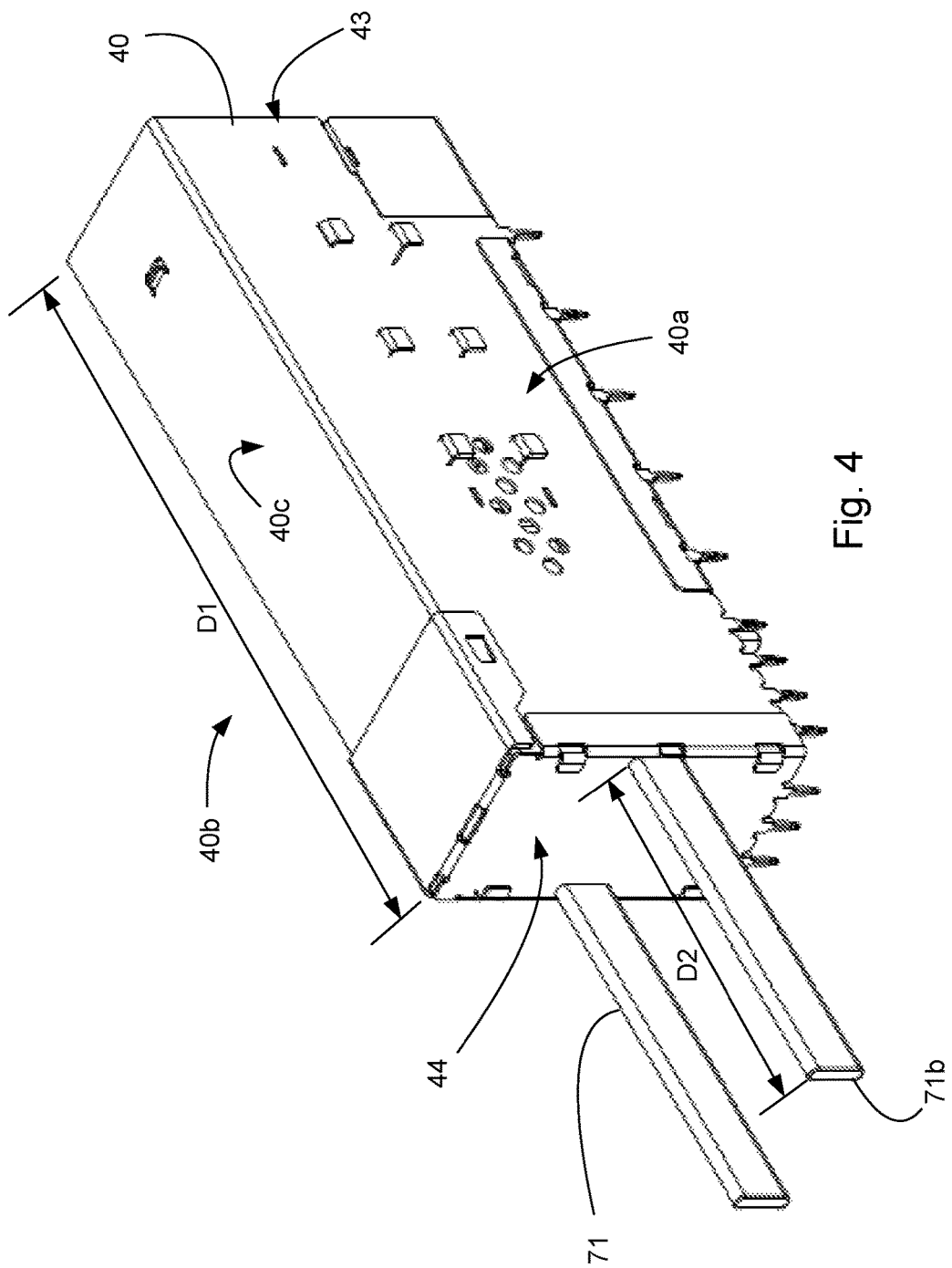
FIG. 4 illustrates a perspective view of the embodiment depicted in FIG. 1C with a heat sink removed for purposes of illustration.
Figure 5:
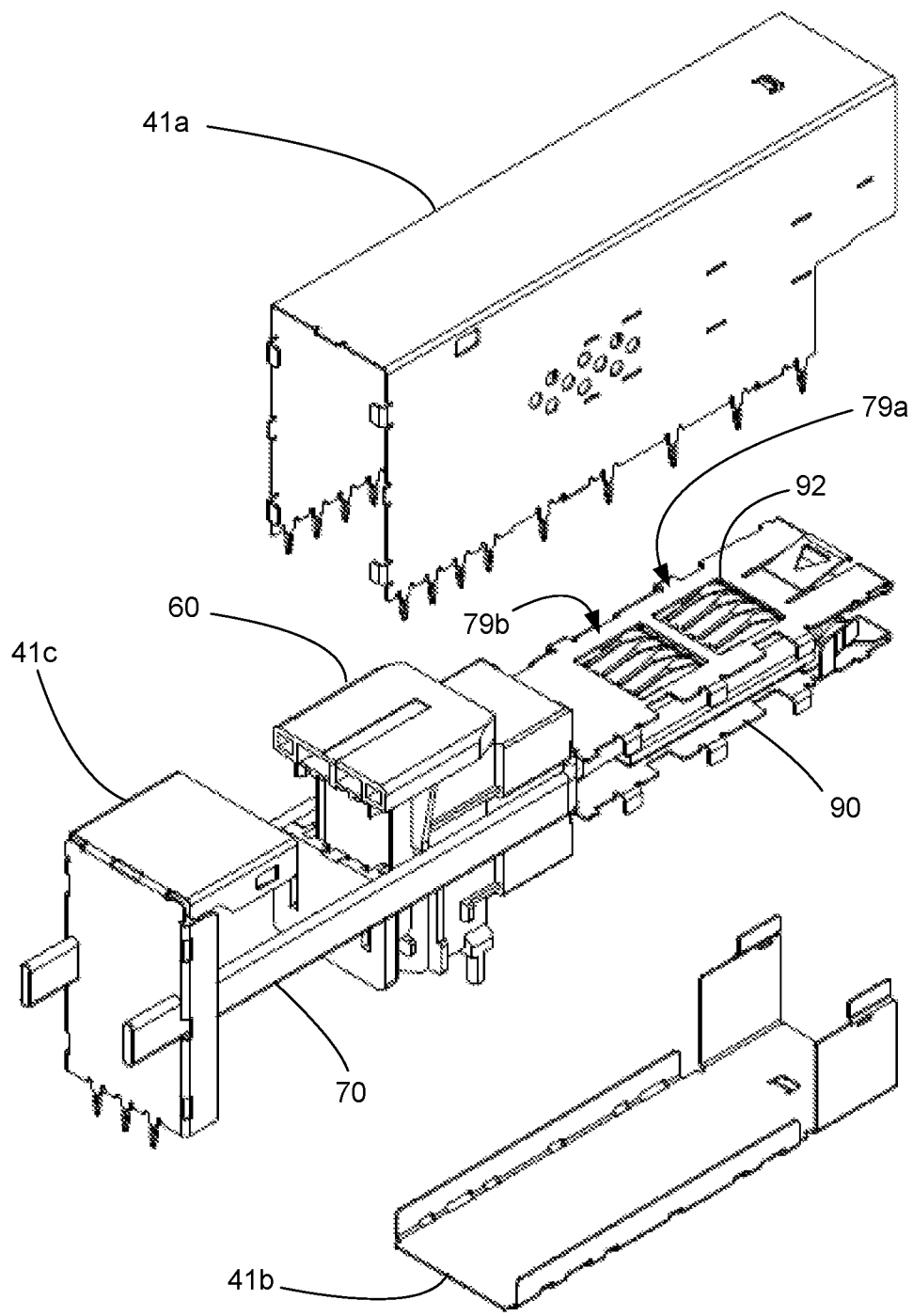
FIG. 5 illustrates an exploded perspective view of the embodiment depicted in FIG. 4.

As can be appreciated from FIG. 4, the heat pipes 71 are configured to extend through the rear wall 44 of the cage. The cage 60 is configured so that there is a first distance D1 between a front edge 43 and the rear wall 44. The depicted heat pipes 71 extend a distance D2 from the rear wall 44 to the rear 71b but are within the outer boundaries of the cage 40 (e.g., they extend between sides 40a, 40b and top 40c). The portion of the heat pipe 71 that extends the distance D2 is the cooling region 74. D2 can be configured to be at least 10% of D1 and preferably D2 will be at least 30% of D1. One significant benefit of the construction is that it allows for ganged connectors, particularly with the heat sink 80', as will be discussed below. The depicted design allows the depicted embodiment of a 2×1 connector to be replaced with a 2×N connector where N will typically be between 1 and 9 but could be as larger if desired.

As depicted in the Figs., two different configurations of a heat sink are disclosed, heat sink 80 and heat sink 80'. While two heat sinks are depicted, it should be noted that any number of configurations are possible and thus the depicted embodiments are not intended to be limiting unless otherwise noted. Heat sink 80 includes fins 82 with apertures 82*a* that are configured to extend around the heat pipes 71. The fins 82 are secured to a block 83 and the block 83 includes apertures 83*a* that also allow the heat pipe to pass through the block 83. One thing that is apparent from heat sink 80 is that it will tend to extend past the heat pipes and thus, while providing lots of surface area for cooling, may interfere with an attempt to place another such connector directly against the existing connector. Or to put it another way, ganged connectors might be problematic.

Heat sink 80' also is configured to engage the heat pipe 71, however heat sink 80' is configured such that its outside edge 87*a* is flush with the heat pipe 71 and thus would be suitable for use in a ganged configuration. Heat sink 80' includes two blocks 83' are intended to join together and each block 83' include a groove 84' and the groove 84' is configured to accept transfer member 86'. Transfer member 86' is configured to direct thermal energy from the block 83' to the fins 82'. The fins 82' include slots 82*a* or opening 82*b* to engage the transfer member 86'. In practice, the block 83', the transfer member 86' and the fins 82' can all be soldered to the form a half of the heat sink and two halves can be joined so that heat pipe grooves 89' engage the heat pipes 71 and provide good thermal transfer therebetween.

As noted above, the thermal transfer module 70 includes the thermal interface 76 adjacent the nose that is intended to thermally couple to plug connectors that are inserted into the ports 26, 28. The thermal interface 76 directs the thermal energy from the inserted plug connectors to the heat pipe 71, which functions as discussed above. In operation, for example, the depicted thermal interface 76 uses the fingers 78 to engage an insert a plug connector when it is inserted and thus help conduct heat from the inserted plug connector to the heat sink. It should be noted that in alternative embodiments it may be possible to remove the fingers and rely on convection between the inserted plug connector and the thermal plate 75. In addition, a traditional biasing system (such as spring-like clips could that are used in a riding heat sink designs) could also be used to bias an inserted module toward the plate and or heat pipe. Thus, the thermal interface 76 can be optimized so that it provides the needed thermal coupling between an inserted plug connector and the thermal transfer module 70.

As depicted, the heat pipe 71 is configured so that it extends in a substantially horizontal direction (assuming the expected orientation of a right angle connector is conventional) on opposite sides of the housing. By making the heat pipe thin it is possible to provide high efficient thermal transfer between a thermal interface and a corresponding heat sink. In an alternative embodiment the heat pipe could be angled so as to further improve the efficiency of the heat pipe. It is expected, however, that a horizontal heat pipe is sufficiently efficient at transferring thermal energy such that the additional manufacturing complications that would result from using an angled heat pipe would not provide a desirable tradeoff, at least not when the additional costs was compared to the increase in efficiency.

Figure 9:
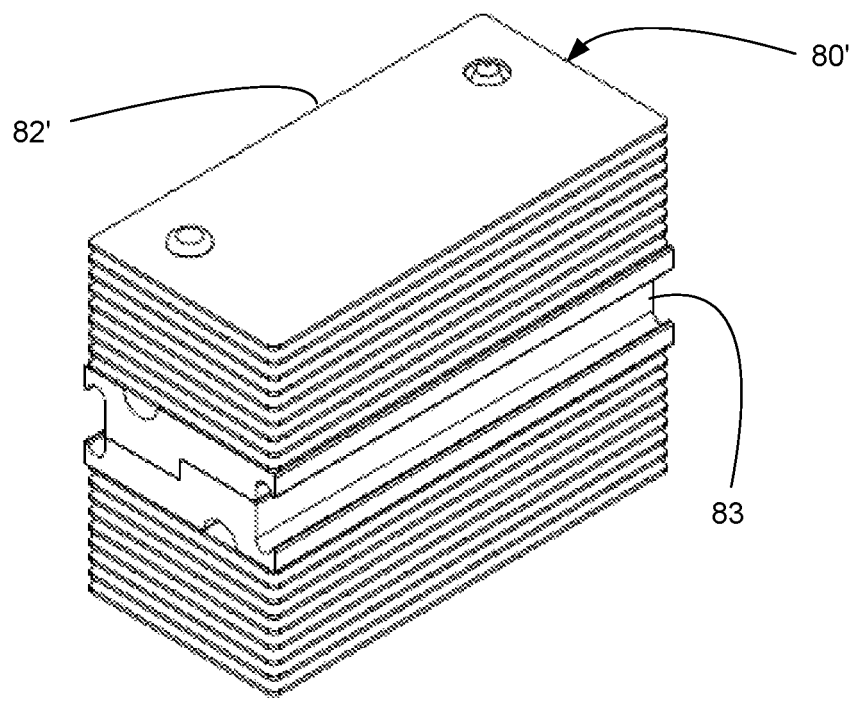
FIG. 9 illustrates a perspective view of another embodiment of a heat sink.
Figure 10:
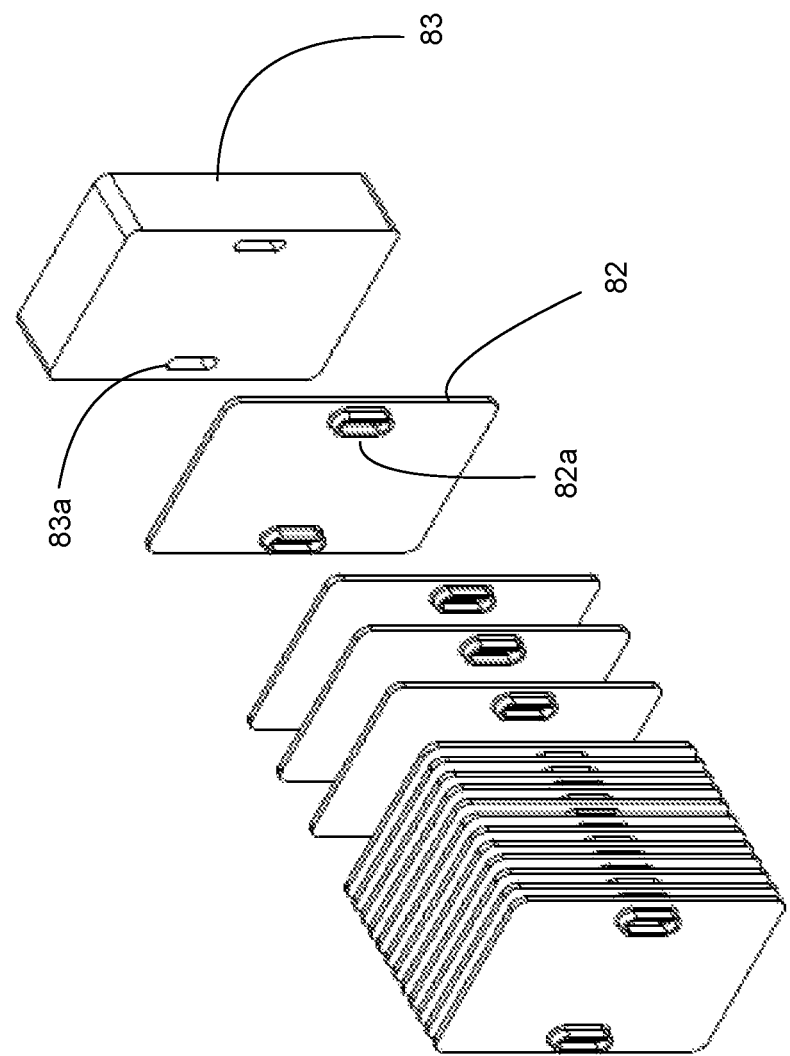
FIG. 10 illustrates a partially exploded perspective view of the heat sink depicted in FIG. 8.
Figure 11:
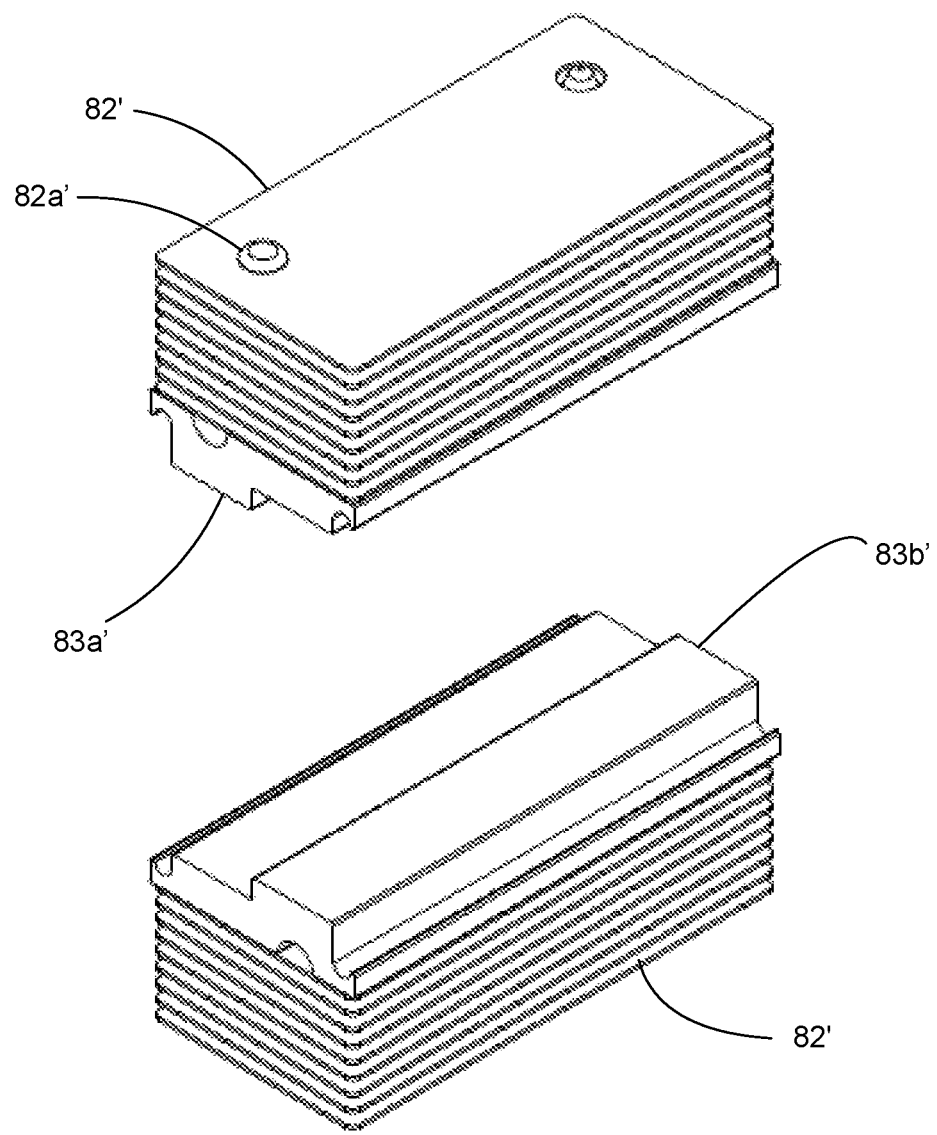
FIG. 11 illustrates a perspective view of two halves of the heat sink depicted in FIG. 9.
Figure 12:
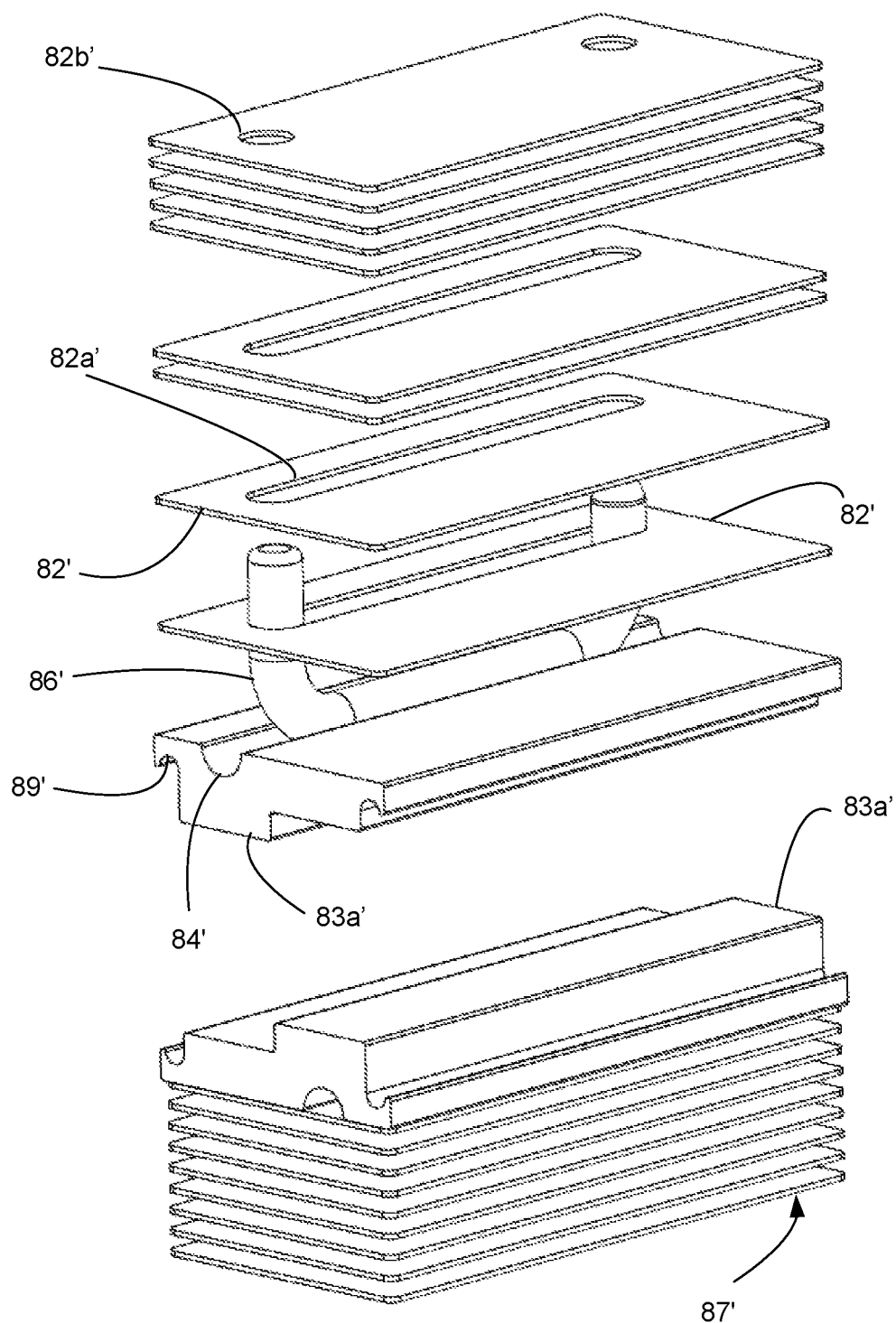
FIG. 12 illustrates a partially exploded perspective view of the embodiment depicted in FIG. 9.
Figure 13:
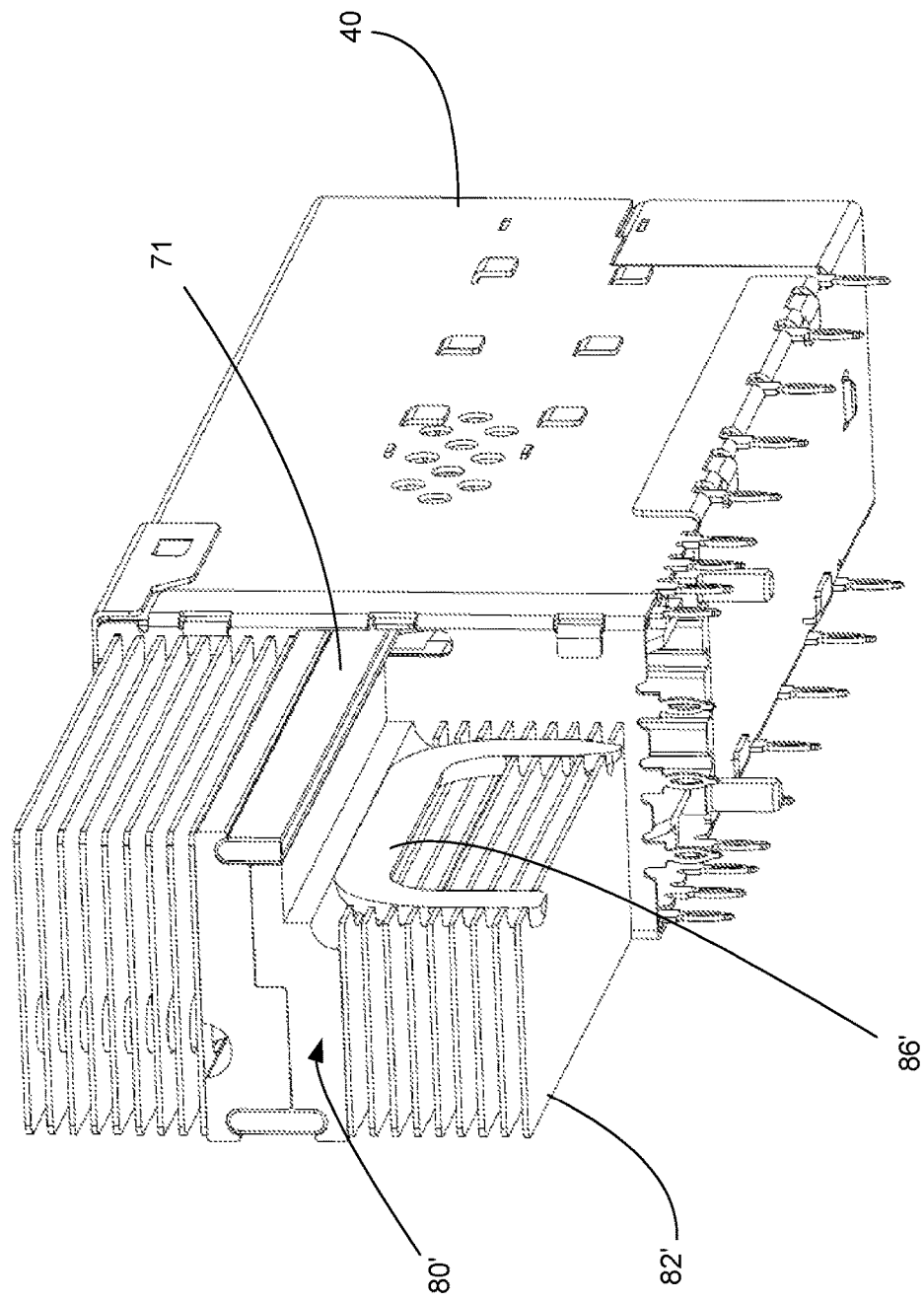
FIG. 13 illustrates a perspective view of an embodiment of a connector with a portion of a heat sink removed for purposes of illustration.
Figure 14:
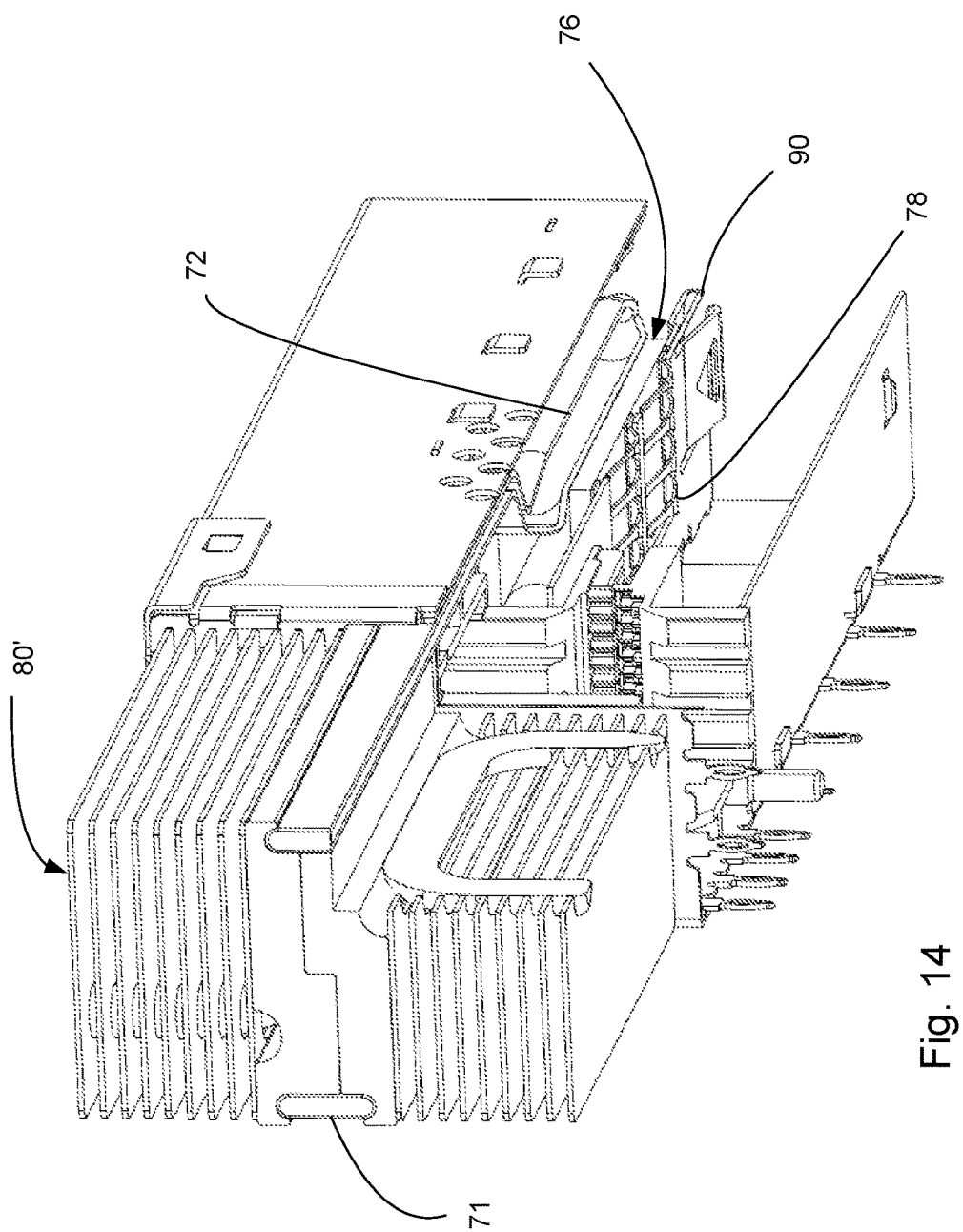
FIG. 14 illustrates a perspective view of the embodiment depicted in FIG. 13 but with an additional portion of the connector removed for purposes of illustration.

As can be appreciated, the depicted embodiments have the rear member 41*c* being slid over the heat pipes 71 and then into position so that the cage 40 is formed. The design of the cage 40 thus is benefited if the rear member 41*c* is formed as a separate piece instead of following the typically more desirable design direction of having the rear wall being integral with the rest of the cage and just folded into position. Once the cage is assembled so that the heat pipes extend out the rear wall 44, a heat sink (such as heat sink 80, 80') can be mounted to the heat pipes 71. Such a construction is advantageous because it allows the connector to be manufactured and even assembled without requiring that the heat sink hang off the rear of connector during manufacture of the connector or mounting of the connector to the circuit board. To ensure good thermal connection between the heat sink and the heat pipes, the heat sink can be configured to snuggly engage the heat pipes via a slight interference fit. Alternatively it is possible to have a two piece heat sink that is bolted onto the heat pipes in a manner that ensure a reliable thermal connection between the heat pipe and the heat sink. For example, the heat sink depicted in FIG. 9 is a basically two similar halves that are connected together (for example, the two halves can be soldered together). It should be noted that the depicted fins can also be soldered together so that there is a good thermal connection between the fins, as is known in heat sink design. If desired, the two halves can instead be configured to be secured together with one or more fasteners and the interface between the heat pipes and the heat sink can include some compliance so as to ensure a suitable and reliable thermal connection. The compliance could be provided by a compressible thermal compound or thermal grease or by having the heat sink slightly compress the heat pipes when the heat sink is attached.

It should be noted that the heat sink can be any desirable design. The depicted embodiments of the heat sink, for example, show heat sink designs that include a number of fins that are supported by a block. The block, which provides mass and strength, could be omitted. Other heat sinks designs, such as solid blocks or liquid cooled heat sinks, could also be used in the appropriate application. Thus, the depicted embodiments of heat sinks are not intended to be limiting unless otherwise noted.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:
1. A connector assembly, comprising:
a wafer set, the wafers having terminals that have contacts that extend from the wafer in a first direction and tails that extend from the wafer on a second side, the contacts being arranged in rows;
a first card slot and a second card slot spaced apart vertically, wherein the rows of contacts are positioned in the first and second card slots;
a cage positioned around the wafers and the card slots and having a rear wall, the cage defining a space having a first port and a second port, the first port aligned with the first card slot and the second port aligned with the second card slot; and
a thermal management module with a nose and a rear, the nose positioned between the first and second port, the thermal management module including a first thermal interface configured to extend into the first port, the thermal management module including a heat pipe that extends from the nose to the rear, the rear extending rearward of the rear wall, wherein the heat pipe is configured to direct thermal energy from the nose to the rear and the first thermal interface is configured to direct thermal energy to the heat pipe.
2. The connector of claim 1, wherein the first thermal interface is configured to engage a plug connector when a plug connector is inserted into the first port.

3. The connector of claim 1, wherein the first thermal interface is configured to direct thermal energy to the heat pipe from a plug connector when a plug connector is inserted into the first port.

4. The connector of claim 1, further comprising a heat sink that is thermally coupled to the rear.

5. The connector of claim 4, wherein the heat pipe extends out of an aperture in the rear wall.

6. The connector of claim 5, wherein the cage has a first wall and a second wall and a top wall and the heat sink is configured to be positioned within a region defined by the first, second and top wall.

7. The connector of claim 6, wherein the first thermal interface includes a plurality of fingers.

8. The connector of claim 7, wherein the cage further includes an insert that helps define the first and second port, the thermal management module supported by the insert.

9. A connector assembly, comprising:
a cage defining a space having a first port and a second port, the cage including a rear wall and having a front edge that collectively define a first distance;
a first card slot positioned in the first port and a second card slot positioned in the second port, the first and second card slots recess from the front edge;
a thermal management module with a nose and a rear, the nose positioned between the first and second port, the thermal management module including a first thermal interface that extends into the first port, the thermal management module including a heat pipe that extends from proximate the nose to the rear, the rear extending rearward of the rear wall, wherein the heat pipe is configured to direct thermal energy from the nose to the rear and the first thermal interface is configured to direct thermal energy to the heat pipe.

10. The connector assembly of claim 9, wherein the heat pipe extends past the rear wall a second distance, the second distance being at least 10 percent of the first distance.

11. The connector assembly of claim 10, wherein the second distance is at least 30% of the first distance.

12. The connector assembly of claim 9, wherein the heat pipe is a first heat pipe and the thermal management module has a second heat pipe that extends from proximate the nose to the rear.

13. The connector assembly of claim 12, wherein at least a portion of the first and second heat pipes extend along opposite sides of the cage.

14. The connector assembly of claim 12, wherein the first and second heat pipe are closer together proximate the nose than they are as they extend rearward past the rear wall.

15. The connector assembly of claim 14, wherein a plurality of fins connects the first and second heat pipes together.

16. The connector assembly of claim 9, wherein a plurality of fins are connected to the heat pipe, the fins being located rearward of the rear wall.

17. The connector assembly of claim 9, wherein the first thermal interface is configured to engage a plug connector when a plug connector is inserted into the first port.

18. The connector assembly of claim 9, wherein the first thermal interface is configured to direct thermal energy to the heat pipe from a plug connector when a plug connector is inserted into the first port.

* * * * *